UNITED STATES PATENT OFFICE.

ALEXANDER WARFIELD, OF PHILADELPHIA, PENNSYLVANIA.

IMPROVEMENT IN THE MANUFACTURE OF SOAP.

Specification forming part of Letters Patent No. 108,540, dated October 18, 1870.

*To all whom it may concern:*

Be it known that I, ALEXANDER WARFIELD, of Philadelphia, in the county of Philadelphia and in the State of Pennsylvania, have invented certain new and useful Improvements in Compound for Soap; and do hereby declare that the following is a full, clear, and exact description thereof.

The nature of my invention consists in a compound for soap, as will be hereinafter fully set forth.

In order to enable others skilled in the art to which my invention appertains to make and use the same, I will now proceed to describe it.

My soap is composed of the following ingredients in about the following proportions: One hundred pounds common hard soap, fifteen quarts lye, and twenty ounces pearlash or its chemical equivalent.

These ingredients are placed over the fire, and stirred thoroughly until they are partially dissolved, when I add twelve ounces of borax, and, when fully dissolved, I add ten pounds of glycerine. When this has been thoroughly stirred it is removed from the fire; and at this time if a perfume is desired it should be added to the mixture. When it has cooled to about 140° I add seven and a half pints turpentine, two and a half pints benzole, and five pints ammonia.

If desired an absorbent may now be added, such as flour of wheat or rye, chalk, or talc, at the rate of ten pounds to the above mixture. When an absorbent is used I prefer to use flour for various reasons, although others may be substituted.

The entire mixture is thoroughly stirred, and poured into frames or flasks preparatory to being cut into bars or cakes.

This soap may be used for washing the finest silks and laces, and may be used with any kind of water, hard or soft, warm or cold, as may be desired.

Having thus fully described my invention, what I claim as new, and desire to secure by Letters Patent, is—

A compound for soap, consisting of soap, lye, pearlash, borax, glycerine, turpentine, benzole, and ammonia, or their chemical equivalents, with or without a perfume, and with or without an absorbent, substantially as herein set forth.

In testimony that I claim the foregoing I have hereunto set my hand this 1st day of October, 1870.

ALEX. WARFIELD.

Witnesses:
C. L. EVERT,
J. E. HUTCHINSON.